United States Patent Office

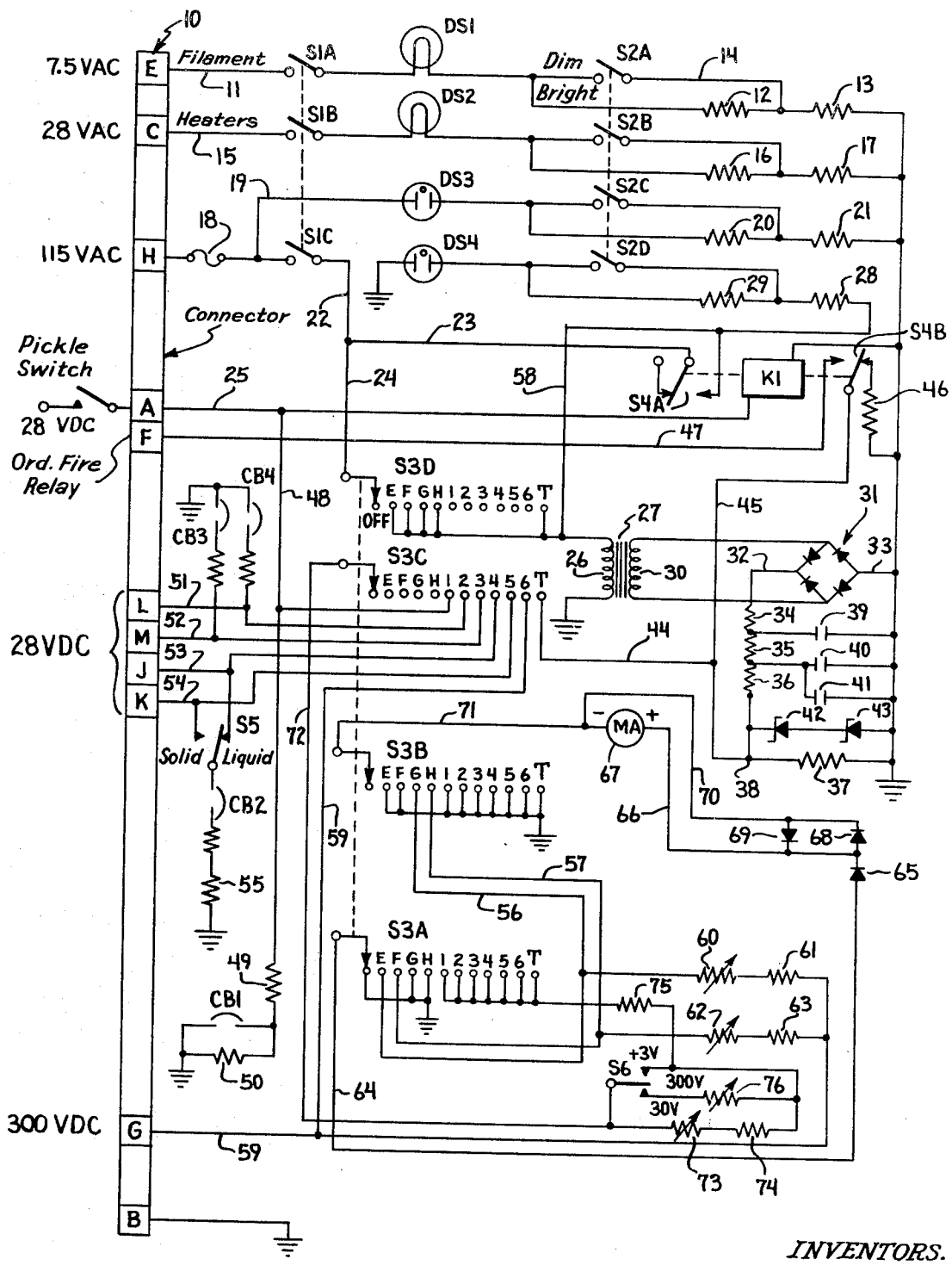

3,518,779
Patented July 7, 1970

3,518,779
CHECKOUT EQUIPMENT FOR MISSILE CARRYING AIRCRAFT
Lawrence D. Cox, Lemoore, and Robert T. Price, Santa Susana, Calif., assignors to the United States of America as represented by the Secretary of the Navy
Filed Dec. 19, 1967, Ser. No. 691,831
Int. Cl. G01r 15/12; G09b 9/08
U.S. Cl. 35—12                                6 Claims

ABSTRACT OF THE DISCLOSURE

A circuit component portable unit for connecting to a launcher plug-in having loaded circuits, switches, and voltage sources simulating the loads and self-contained voltages in a missile for which this check is made and switchable in the sequence of loads and voltages applied for the missile intended thereby checking all launcher circuits under actual load conditions.

BACKGROUND OF THE INVENTION

This invention relates to test circuits and more particularly to a test circuit having circuit loads, switches, and voltage sources therein exactly simulating those of a missile in the sequence of launch.

In prior known missile test devices the ready condition of the missile launcher was given an electrical continuity check. This type check lacked loading and proper voltage monitoring and accordingly would not detect circuit breakdown in the launcher for actual loads or voltages applied to the missile.

SUMMARY OF THE INVENTION

In the present invention a test circuit is constructed having all the loads and voltages corresponding to those of the missile to be launched. This test circuit consists of a plurality of circuits of various loads and self-contained voltage sources that are coupled through function switches to a connector adaptable for connecting to the launcher. The loads and voltage sources correspond to or simulate the circuit loads and voltages of the missile to be launched so that the launcher circuits can be checked for continuity and load breakdowns. The function switch enables the operator to apply loads and voltages to the launcher circuits in the same sequence as would be applied for an actual launching of the missile. It is accordingly a general object of this invention to provide a test circuit simulating the electrical loads and voltages in a missile such that, when connected to the missile launcher, will test the circuit continuity and voltage load monitoring ability of the launcher circuit.

BRIEF DESCRIPTION OF THE DRAWING

These and other objects and the attendant advantages, features, and uses will become more apparent to those skilled in the art as a more detailed description proceeds when considered along with the accompanying single figure of the drawing illustrating the invention in circuit schematic form.

DESCRIPTION OF THE PREFERRED EMBODIMENT

Referring more particularly to the drawing, the circuit schematic is shown illustrating circuit loads and voltages to be found in a missile for which the launcher circuits are to be tested. In this invention the reference character 10 identifies a strip representative of a connector which is constructed to mate with the connector in the launcher of the aircraft, ship, or the like. The terminal E of connector 10 has a conductor 11 connected to one pole of a switch S1A in a three-gang switch S1, the other pole of the switch S1A being coupled through an indicator light DS1 and resistors 12 and 13 in series to ground. In parallel with the resistor 12 is a conductor 14 coupled through a dim-bright switch S2A of a four-gang switch S2. The circuit 11 through 14 is a filament circuit and herein indicated as having 7½ volts alternating current (v. AC) adapted to be coupled from the launcher to terminal E. Whenever connector 10 is connected to the launcher, the indicator light DS1 should glow when switch S1 is closed indicating that the transformer in the supply circuit of the launcher is functioning properly. With the switch S2A in the open position, the indicator light DS1 will glow dimly for a "darkened ship" operation and with the switch S2A closed the indicator light DS1 will glow brightly.

In like manner a heater circuit is coupled by a conductor 15 from terminal C of connector 10 through switch S1B, through an indicator glow lamp DS2, and through resistors 16 and 17 to terminal ground. When switch S1B is closed, the indicator lamp DS2 should glow indicating that the transformer in the launcher circuit is supplying 28 v. AC to the test heater circuit herein. Terminal H of connector 10 is coupled through a fuse 18, over the conductor 19, through a neon indicator lamp DS3, and resistors 20 and 21 to the ground terminal. Whenever the connector 10 is coupled to the launcher and S1 is closed, the neon glow tube DS3 should glow indicating that 115 v. AC are being supplied to the missile circuit. A branch circuit 22 from terminal H through the switch S1C supplies voltage through the single-pole-double-throw switch S4A to the left dead pole, as shown in this figure, over conductor branch 23 while the conductor branch 24 supplies voltage to the switch slider tap of a switch gang S3D of a ganged function switch S3. The first contact of the function switch S3 is the "off" position in which the pole is dead, except in S3A the "off" position pole is coupled directly to ground.

A conductor 25 is coupled to terminal A in the connector 10, this conductor being to one terminal of an electromagnetic coil K1 of a relay switch S4A and S4B, the opposite terminal of the electromagnetic coil being coupled directly to ground. Terminal A of connector 10 is shown as having a pickle switch on the launcher side merely to illustrate for the purpose of better understanding an example of this invention that the pickle switch is connected to this terminal from a 28 v. DC source in the launcher to establish an initiator fire control circuit. Whenever the pickle switch is engaged, switches S4A and S4B will be switched to the opposite poles as shown in this figure. When S4A is switched by the energization of K1, conductor 23 will be connected to the right pole of S4A placing the primary winding 26 of transformer 27 into circuit and at the same time will place resistors 28 and 29 in series with a neon indicator bulb DS4 will glow indicating that current is being applied through the primary winding 26 of transformer 27. All indicator lamps DS1 through DS4 can be made to operate in their "darkened ship" position when switch S2 is left open, of in their bright indicated condition when switch S2 is closed. The secondary winding 30 of transformer 27 is coupled to a rectifier circuit 31 of any conventional known type to produce a rectified voltage output on the output conductor 32, the opposite conductor 33 being coupled to ground. The output 32 is coupled through resistors 34, 35, 36, and 37 in series to ground, terminal 38 at the junction of 36 and 37 being the output terminal for the rectified voltage. The rectified output on conductor 32 is filtered by capacitors 39, 40, and 41 coupled between the junction points of the resistors 34, 35, and 36 and ground. The voltage output from the rectifier 31 is limited to a predetermined voltage, herein given by way of example to be 85 volts, by the Zener diodes 42 and 43 in series coupled between the output terminal 38 and ground. The output terminal 38 is coupled in one branch circuit 44 to the test terminal T in the function switch gang S3C while another branch circuit 45 is coupled to the switch blade of switch S4B. When the relay coil K1 is de-energized the switch blade of S4B is connected to ground through a resistance 46, but in the energized position of K1 the switch blade of S4B is connected to conductor 47 directly connected to the terminal F of the connector 10. Terminal F in the launcher is connected to the ordnance fire relay (not shown) which supplies voltage, after a predetermined delay, to terminals L, M, J, and K of connector 10.

Terminal A of connector 10 (from the pickle switch) is also connected by way of a conductor 48 through a resistor 49 and a circuit breaker CB1, and resistor 50 in parallel to ground. Whenever the pickle switch is closed in the launcher circuit, a current is conducted over the conductor 48 and resistor 49 through the parallel circuit of CB1 and 50. If the pickle switch voltage is proper, the circuit breaker CB1 will be thrown open in approximately 10 milliseconds, or any other time preset and prearranged for testing a particular launcher circuit. The branch circuit 48 is also coupled to terminal 1 of the function switch gang S3C for the purpose later to be described.

Terminal L of the connector 10 is coupled by a conductor 51 through a circuit breaker CB4 to ground and also to terminal 2 of the function switch gang S3C to establish a breech cap circuit. Terminal M is coupled by the conductor 52 through a circuit breaker CB3 to ground and also to terminal 3 of the function switch gang S3C. Connector M establishes also a breech cap circuit. The circuit breakers CB3 and CB4 illustrate the breech cap circuits of the missile representing the jettisoning of the missile from the launcher. As illustrated, 28 v. DC is applied to the terminals L, M, J, and K and if the proper voltage is supplied from the launcher, the circuit breakers CB3 and CB4 will be operated to an open position in approximately 10 milliseconds. A proper operation of the circuit breaker CB3 and CB4 will indicate the proper voltage supplied by the launcher circuit. Terminal J is connected by a conductor 53 to one terminal of the switch S5 and also to terminal 4 of the function switch gang S3C. Terminal K is coupled by the conductor 54 to the other terminal of the switch S5 and also to terminal 5 of the switch gang S3C. The switch terminal coupled to the conductor 53 has the legend "liquid" while the terminal coupled to conductor 54 has the legend "solid" and the switch blade for switch S5 is coupled through a circuit breaker CB2 and a resistor 55 in series to ground. Switch 55 is switched beforehand to either "solid" or "liquid" depending on the type of propellant used in the missile exemplifying this propellant, and when the connector 10 is coupled to the launcher, the circuit breaker CB2, exemplifying the propellant squib, should be thrown open in a predetermined time to indicate proper voltages being supplied to terminals J and K.

The circuit from terminals J and K through the circuit breaker CB2 and load 55 constitutes a motor fire circuit.

The function switch S3 has 12 contacts on each gang. In the gang S3A the "off" contact, G, and H contacts are connected directly to ground. Contact E of S3A is coupled by the conductor 56 to contact G of S3B and contact F of S3A is coupled by the conductor 57 to contact H of S3B. Contacts E, F, 1 through 6, and T of the gang S3B are coupled directly to ground. In the gang S3C the "off" terminal and terminals E, F, G, and H are all dead contacts. The gang S3D contacts E, F, G, H, and T, are coupled to the primary winding 26 of the transformer 27. Primary 26 of transformer 27 is also coupled by way of conductor means 58 to the right-hand contact of the relay switch S4A. Contacts 1 through 6 of the function gang switch S3D are all dead poles.

Terminal G of the connector 10 has a 300 v. DC connected thereto from the launcher and this terminal is connected by the conductor 59 over one branch conductor to contact 6 of the gang function switch S3C and also in parallel through a variable resistor 60 and a fixed resistor 61 to the conductor 56 and through a variable resistor 62 and a fixed resistor 63 to the conductor 57. The slider contact of the function switch gang S3A is coupled by a conductor 64 through a diode 65 and conductor 66 to the positive side of a milliammeter 67 and also through reversely oriented diodes 68 and 69 over conductor 70 to the negative terminal of the milliammeter 67. This negative terminal of the milliammeter 67 is coupled by conductor 71 to the slider contact of the function switch gang S3B. The slider contact of the function switch gang S3C is coupled by the conductor 72 to the switch blade of a single-pole-throw switch S6, also through a variable resistor 73 and a fixed resistor 74 to the upper contact of switch S6, and also through a fixed resistor 75 to contacts 1 through 6 and T of the function switch gang S3A. The junction of resistors 74 and 75 is coupled also through a variable resistor 76 to the lower pole of the switch S6. Switch S6 is normally open which provides 300 volts to the output of resistor 75 whereas, if switch S6 is on the lower pole, 30 volts is applied for full scale deflection of meter 67 and if switch S6 is in contact with the upper pole, 3 volts is applied for full scale deflection of meter 67, as will later become clear in the description of operation. The variable resistors 60, 62, 73, and 76 are used to adjust the voltage in accordance with the milliammeter reading of the milliammeter 67 as will later become clear in the description of operation. Diodes 68 and 69 protect the milliammeter 67 from over voltages applied to the terminals thereof.

DESCRIPTION OF OPERATION

In the operation of the device let it be assumed that the connector 10 is coupled to the mating launcher connector when all circuit breakers CB1 through CB4 are closed. If now switch S1 is closed, the filament circuit, heater circuit, and voltage supply circuit through the fuse 18 may be checked to see if the transformer in the launcher is producing proper voltages by indication of the indicator lights DS1, DS2, and DS3. These indicator lights will glow dimly when the switch S2 is in its open or dim position but may be made to glow brightly when switch S2 is closed. If now the pickle switch is held down to produce the voltage over the input terminal A, the relay switch S4 will cause the indicator light DS4 to glow in either the dim or bright condition, depending on whether the switch S2 is open or closed, indicating that switch S4A has been switched to the right to energize the primary 26 of transformer 27 to cause rectifier 31 to produce a rectified voltage of 85 volts, for example, on the output 45 through switch S4B to the conductor 47 and the ordnance firing relay in the launcher (not shown). After a predetermined delay, voltage will be supplied to terminals L, M, J, and K to the amount of 28 volts, as used for the purpose of example herein, to cause the circuit breaker CB1 through CB4 to be opened after a predetermined period of time indicating that the proper voltages are being supplied from the launcher. Circuit breaker CB2 will be opened for either switch condition "solid" or "liquid" contact in switch S5.

In checking the launcher circuit in a sequence of operations which the missile should go through in monitoring the various loads and voltages the pickle switch is left open in this example and the function switch S3 placed to contact E. Here again the indicator lamp DS4 will glow since voltage from terminal H is supplied by way of conductors 22 and 24 to the primary 26 of transformer 27. Also in this E position of the function switch S3, terminal G is connected by way of conductor 59 through the resistors 61 and 60 to terminal E of S3A, the slider contact, through conductor 64, diode 65, through the milliammeter 67, and conductor 71 to ground through the movable tap of S3B. The meter reading of 67 will verify the proper DC signal being applied from the launcher. If this current is incorrect to simulate the proper load, it can be corrected by the variable resistor 60. Turning the function switch to the F contact, voltage from terminal G is conducted by way of conductor 59, through resistors 62 and 63 to contact F of S3A, over conductor 64, through rectifier 65, and conductor 66 to the positive side of milliammeter 67, the negative output being by way of conductor 71 through the movable contact to ground through terminal F of S3B. The meter 67 may be calibrated by the variable resistor 62. It may be seen that contacts E and F of the function switch check the positive voltage currents applied to the milliammeter whereas G and H will check negative voltage currents through resistors 60 through 63. With the function switch S3 in G position the voltage applied at terminal G is through 60, 61, over conductor 56 to contact G of S3B, and over conductor 71 to the negative terminal of 67, the positive terminal of which is coupled through 65, 64, slider contact of S3A to terminal G directly to ground. A similar test is made when the function switch is placed on contact H at which time terminal G is coupled through resistor 62, 63, conductor 57, contact H of S3B, and conductor 71 to the negative terminal of 67, the positive terminal of which is coupled by way of conductor 66, diode 65, conductor 64, adjustable tap of S3A to contact H directly to ground. These checks test the input voltage of terminal G for the missile circuit which is sometimes referred to as the "fuse function circuit" applied from the aircraft or ship to the missile.

Passing the function switch S3 over the contacts 1 through 6 will test the various circuits for malfunction. With the function switch S3 on contact 1 and with the pickle switch open in the launcher (not shown), the circuit via the conductor 25 will be by way of contact 1 of S3C, over the conductor 72 to the switch blade of S6, through resistors 73, 74, and 75 to contact 1 of S3A, over conductor 64 to rectifier 65 to the positive side of the milliammeter 67, the negative terminal of which is coupled by 71 to contact 1 of S3B to ground. S6 can be later thrown to the 30 volt contact and the 3 volt contact, the three positions of which should provide no meter deflection in the milliammeter 67. If any meter deflection does exist it would indicate that a malfunction voltage would exist at terminal A of connector 10. Resistors 73, 74, 75, and 76 provide the load circuit for this malfunction test of the input at terminal A in connector 10. In the position of the function switch S3 to the contact 2, the L terminal input over conductor 51 may be checked in like manner. When function switch S3 is placed to contact 3, the M input over conductor 52 may be checked for any malfunction. With function switch on contact 4, the input J over conductor 53 is checked and when the function switch is placed on contact 5 the input K over the conductor 54 may be checked for any malfunction. When the function switch is placed on contact 6, the input of terminal G of connector 10 may be checked in like manner for any malfunction. In the test position when the function switch is placed on contact T, the internal power supply developed by the rectifier 31 may be tested. In this position the voltage from terminal H through fuse 18 is coupled through closed switch S1C to the wiper contact of switch S3D and through the primary 26 of the transformer 27. This starts the rectifier to produce a voltage output at terminal 38 which is conducted by way of conductor 44 to the test terminal T of S3C and over conductor 72 through resistors 73, 74, and 75, through terminal T of S3A and over conductor 64, through diode 65, and conductor 66 to the positive terminal of the milliammeter 67, the negative terminal of which is connected by way of 71 and test terminal T of S3B to ground. Milliammeter 67 in this case should read 85 volts which is a test of the output of the internal power supply 31. In this testing circuit the voltage produced by the rectifier simulates the battery output from an ordinary missile. The sequence of test is the sequence that the missile goes through by applying various loads in sequence and in producing or monitoring voltages for missile operation. Accordingly, all the launcher circuit outputs can thus be tested under actual load conditions and voltage monitoring conditions prior to connection of an actual missile to the launcher for delivery toward an enemy target.

While many modifications and changes may be made in the constructional details and features of this invention without departing from the spirit of the invention, as by changing the voltage and load values herein for different missiles, it ist to be understood that we desire to be limited in the scope of our invention only by the scope of the appended claims.

We claim:
1. A checkout circuit simulating the circuit of a missile for checking out the missile launcher circuits comprising:
   a filament circuit, a heater circuit, and a power supply circuit, each having an electrical load therein simulating the respective filament, heater, and power loads of the missile;
   an initiator fire control circuit having two branch circuits, one branch circuit being through a relay switch controlling first and second switches and the other branch circuit being through a parallel network of a first circuit breaker and a resistance, said circuit breaker simulating a guidance and control squib of the missile;
   a transformer having a primary in circuit through said first switch of said relay switch to said power supply circuit, the secondary of said transformer being coupled to a rectifier to produce a direct current voltage on an output thereof simulating the battery source in the missile, the output of said rectifier being through said second switch of said relay switch to an ordnance firing relay;
   first and second breech cap circuits, having second and third circuit breakers, respectively, therein to break when sufficient voltage is applied thereto, each circuit breaker simulating a breech cap for jettisoning a missile;
   a motor fire circuit coupled through a selector switch and a fourth circuit breaker, said selector switch simulating the circuit for liquid and solid propellants and said fourth circuit breaker simulating the power necessary to ignite said propellant when thrown open;
   a fuse function circuit adapted to apply a voltage simulating the voltage supplied from launcher to missile;
   a meter;
   a ganged function switch having switch contacts coupled to said power supply circuit, to said initiator fire control circuit, to said first and second breech cap circuits, to said motor fire circuit, to said fuse function circuit, and to said meter to cause switching of said several circuits selectively through said meter to meter current flow; and
   means adapted for coupling all said circuits to a launcher of the missile to check the launcher circuits whereby the continuity of the launcher circuits and the monitored voltages of the launcher under actual load conditions are checked for proper operation by function switch combinations.
2. A checkout circuit as set forth in claim 1 wherein said filament circuit, said heater circuit, and said power supply circuit each have indicator lights therein and said electrical loads are two resistors in series with a switched network parallelling one resistor to produce two current conditions in the switch open and closed positions.
3. A checkout circuit as set forth in claim 2 wherein said rectifier is a bridge network of diodes the output therefrom being coupled to a filter network and through a Zener diode means to a fixed potential to filter and amplitude limit the rectified output voltage.

4. A checkout circuit as set forth in claim 3 wherein said function switch has the movable contact of one gang coupled through a single pole double throw switch to two outputs, each output having resistance elements simulating electrical loads of different voltage levels.

5. A checkout circuit as set forth in claim 4 wherein said fuse function circuit includes variable resistor loads simulating loads verifying the voltage supplied by the launcher.

6. A checkout circuit as set forth in claim 5 wherein said second switch of said relay switch is in circuit from the output of said rectifier to an ordnance firing relay in the energized condition of said relay switch and to a fixed potential through a resistance in the unenergized condition of the relay switch.

References Cited

UNITED STATES PATENTS 3,242,593  3/1966  Brenegan _____ 35—12

EUGENE R. CAPOZIO, Primary Examiner

P. V. WILLIAMS, Assistant Examiner

U.S. Cl. X.R.

324—73